R. De GRAY.
Cranberry-Gatherers.

No. 146,579. Patented Jan. 20, 1874.

Witnesses.
Samuel Brock,
James B. Murtagh.

Inventor.
Richard De Gray.

UNITED STATES PATENT OFFICE.

RICHARD DE GRAY, OF NEW ORLEANS, LOUISIANA.

IMPROVEMENT IN CRANBERRY-GATHERERS.

Specification forming part of Letters Patent No. 146,579, dated January 20, 1874; application filed April 26, 1873.

*To all whom it may concern:*

Be it known that I, RICHARD DE GRAY, of the city of New Orleans, State of Louisiana, have invented new and useful Improvements in Cranberry-Gatherers, of which the following is a specification:

My invention has for its object to gather or pluck the cranberries from the vines in a rapid and efficient manner without cutting or injuring the vines or tendrils of the plant; and it consists of a scoop-shaped body mounted upon a roller, and provided at its forward end with teeth resting on springs, and above with a revolving rake and endless apron, and a receptacle for the gathered fruit, arranged and operating as hereinafter set forth; in a series of springs projecting downward and backward from the teeth, for the purpose of bearing upon the runners or young vines of the plants, and holding them from being broken or having their rootlets torn from the ground while the berries are being detached by the revolving rake, and in the mode of plucking and delivering the berries by means of revolving rakes and an endless band or apron, so arranged and operated as to strip the berries from the vines in a vertical direction, so as to effect the least injury to the vines.

Figure 1:
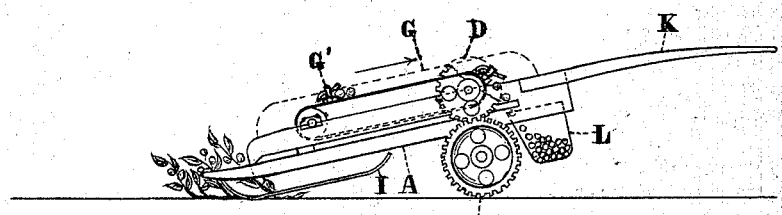
Figure 2:
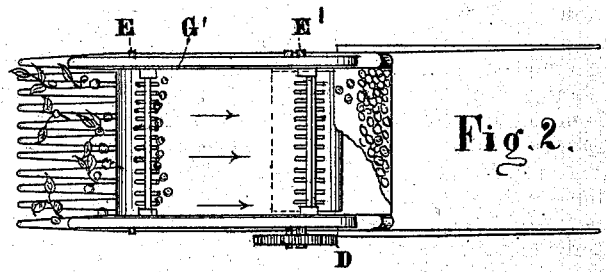
Figure 3:
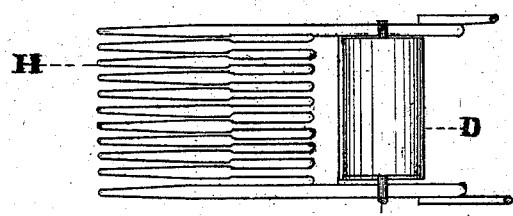

Figure 1 of the accompanying drawings is a side elevation of my improved cranberry-gatherer. Fig. 2 is a detailed plan view of the apparatus, showing its mode of action in plucking and delivering the berries. Fig. 3 is a plan view of the body of the apparatus and the roller on which it is mounted, the other parts being removed.

As represented in the drawings, A is a shallow scoop-shaped box, which forms the body of the apparatus, and is mounted outside its center of gravity on the roller B, so that its forward end may always rest upon the surface of the ground. One of the journals F of the roller B projects beyond the side of the box, and carries the cog-wheel C. The forward end of the scoop or body is formed with longitudinal teeth or fingers, H H, and to the under side of each tooth is rigidly attached a light flexible spring, I, which projects downward and backward toward the supporting-roller B, the whole forming a series, which support the forward end of the scoop as it is pushed over the ground, and serve a further important purpose, hereinafter set forth. At a proper height above the top of the scoop-shaped box, and extending across the same, are arranged two rollers or shafts, E E', one at or near the front end and the other near the rear. These rollers carry an endless apron, G, from the surface of which project, at suitable intervals, transverse lines of teeth G', which serve as rakes to pluck the berries from the vines. The endless belt and rakes are rotated by the cog-wheel D, mounted on the shaft of the roller E', which gears with the wheel C on the driving-roller B, and receives motion as the machine is pushed forward by the handles K. A receptacle, L, for the fruit is hung in the rear of the roller E', between the handles K, as seen in Figs. 1 and 2. The rakes G' are arranged at a suitable distance above the floor of the body A, to allow them to move freely, and the under side of the band G, with its rakes G', travels toward the front or toothed end of the apparatus, the upper side traveling toward the rear end or box L, and the stripping of the fruit from the vines takes place at the roller E as the rakes are passing in an upward direction, the berries falling on the apron, by which they are carried back and deposited in the box L. The teeth H raise the fruit-bearing vines and hold them while the rakes remove the berries, and at the same time the springs I I press the runners down upon the ground, and prevent them from being broken or their roots torn from the earth, as would otherwise result from the pulling of the rakes upon the stronger bearing-vines. This result is of the utmost importance, because of the fact that the cranberry-plant propagates by runners, and bears on plants of two years' growth, and the destruction of the young plants, or sets, by the gathering of one crop would ultimate in the loss of one or more succeeding crops.

The operation is as follows: The apparatus is pushed forward by the handles K, by manpower, over the field, its forward end being near to the surface of the ground, so that the springs I I are in contact therewith. As the apparatus moves forward, the springs I I press downward upon the runners or tendrils, which lie close to the ground, and the fruit-bearing vines, being higher, are forced between the teeth H, as in Fig. 2. The roller B being revolved by the forward motion of the apparatus, it communicates its motion to the wheel D, which in turn revolves the rollers E E' and rakes G'. As the rakes pass around the forward roller E, they encounter the berries on the plants which are held between the teeth H, and detach them by drawing in an upward direction, the vines and the tender runners being held firmly to the ground by the pressure of the springs I I upon them, so that no injury is received by the roots of the bearing-plants or the tender rootlets of the runners. The plucked berries are carried before the rakes and deposited in the receptacle L, the rakes returning on the under side of the endless belt. By this action the fruit is gathered nearly free from leaves and broken vines, and the plants, especially their runners and roots, which hold very slightly, owing to the moist soil in which they flourish, are preserved from injury.

I claim as my invention—

1. The combination of the box A, teeth H, springs I I, and receptacle L with the endless apron G and revolving rakes G', arranged to operate, in connection with the series of teeth H, substantially in the manner and for the purpose set forth.

2. The springs I I, in combination with the teeth H for holding the tendrils of the plants while the fruit is severed by the revolving rakes, substantially as set forth.

RICHARD DE GRAY.

Witnesses:
 SAMUEL BROCK,
 JAMES B. MURTAGH.